(12) United States Patent
Foloppe et al.

(10) Patent No.: US 12,553,720 B2
(45) Date of Patent: Feb. 17, 2026

(54) METHOD AND UNIT FOR CALCULATING INERTIAL NAVIGATION DATA

(71) Applicant: SAFRAN ELECTRONICS & DEFENSE, Paris (FR)

(72) Inventors: Yannick Foloppe, Moissy-Cramayel (FR); Benjamin Deleaux, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 157 days.

(21) Appl. No.: 18/278,574

(22) PCT Filed: Feb. 28, 2022

(86) PCT No.: PCT/FR2022/050357
§ 371 (c)(1),
(2) Date: Aug. 23, 2023

(87) PCT Pub. No.: WO2022/185002
PCT Pub. Date: Sep. 9, 2022

(65) Prior Publication Data
US 2024/0151535 A1    May 9, 2024

(30) Foreign Application Priority Data
Mar. 2, 2021   (FR) .................. FR2101987

(51) Int. Cl.
*G01C 21/16*   (2006.01)
(52) U.S. Cl.
CPC .................. *G01C 21/16* (2013.01)

(58) Field of Classification Search
CPC ...... G01C 21/16; G01C 21/165; G01C 23/00; G01S 19/49; G01S 19/20
USPC .......................................... 701/408
See application file for complete search history.

(56) References Cited

U.S. PATENT DOCUMENTS

| 5,760,737 A | 6/1998 | Brenner | |
|---|---|---|---|
| 2002/0169554 A1* | 11/2002 | Suda | G01S 19/22 701/472 |
| 2004/0239560 A1* | 12/2004 | Coatantiec | G01S 19/47 701/472 |

(Continued)

FOREIGN PATENT DOCUMENTS

| EP | 2685218 A2 | 1/2014 |
|---|---|---|
| EP | 2685218 A3 | 3/2016 |

OTHER PUBLICATIONS

International Application No. PCT/FR2022/050357, International Search Opinion and Written Opinion mailed on Jun. 14, 2022, 11 pages (9 pages of original document, 2 pages of English translation).

*Primary Examiner* — Tuan C To
*Assistant Examiner* — Dominick Mulder
(74) *Attorney, Agent, or Firm* — Kilpatrick Townsend & Stockton LLP (57) ABSTRACT

This inertial navigation unit comprises a navigation data acquisition unit (1) and a first navigation stage (2) capable of calculating hybrid navigation values by combining navigation data. It further includes a second navigation stage (3) capable of calculating certified navigation values independently of the hybrid navigation values, said certified navigation values being certified with a geolocation error limit.

7 Claims, 2 Drawing Sheets

(56) References Cited

U.S. PATENT DOCUMENTS

| | | | |
|---|---|---|---|
| 2011/0257927 A1* | 10/2011 | Bharadwaj | G01C 25/005 702/150 |
| 2013/0024013 A1* | 1/2013 | Mullin | G05B 19/0428 700/28 |
| 2014/0324300 A1* | 10/2014 | Halder | G01S 19/49 701/50 |
| 2017/0102467 A1* | 4/2017 | Nielsen | G01S 19/47 |
| 2017/0212248 A1* | 7/2017 | Bobye | G01C 21/18 |
| 2018/0003507 A1* | 1/2018 | Arslan | G01C 21/1654 |
| 2018/0088241 A1* | 3/2018 | Altrichter | G01S 19/21 |
| 2019/0128673 A1* | 5/2019 | Faragher | G01C 21/1652 |
| 2020/0348422 A1* | 11/2020 | Carcanague | G01S 19/44 |
| 2021/0025710 A1* | 1/2021 | Dunik | G01C 21/20 |
| 2021/0293978 A1* | 9/2021 | Barrau | G01C 21/1652 |
| 2022/0042801 A1* | 2/2022 | Wang | G01C 22/006 |
| 2022/0146281 A1* | 5/2022 | Becheret | G01C 25/005 |

* cited by examiner

METHOD AND UNIT FOR CALCULATING INERTIAL NAVIGATION DATA

TECHNICAL FIELD

The present invention relates to inertial navigation units and more particularly relates to a method and a unit for calculating inertial navigation data.

PRIOR ART

Inertial navigation units are for example, but not exclusively, intended to be used for the geolocation of aircraft, boats, land vehicles, etc., for firing control systems, or for target designation.

A lot of work has been carried out to improve the accuracy of inertial navigation units.

Improvement work is essentially based on improving the measuring accuracy of inertial sensors, such as accelerometers and gyroscopes, or on the combination or hybridation of inertial data with data coming from other sensors or with additional behaviour models.

The combination or hybridation of inertial data or of data coming from other sensors often makes it possible to considerably improve the typical geolocation accuracies of an inertial navigation unit.

On the other hand, the hybridation of data often does not make it possible to calculate a reliable statistical accuracy indicator of the geolocation errors.

For such a geolocation error accuracy indicator to be reliable, for this the statistics of the errors of the sensors considered need to be known.

This is generally the case for inertial sensors whose manufacturers may guarantee production error statistics. However, on the other hand, this is not necessarily the case regarding the other sensors used in data hybridation.

Indeed, these data combination techniques are often based on behaviour models of the vehicle, in this case of the aircraft, or of the scene observed, or also of limited databases, which does not make it possible to associate a reliable error statistic with this type of model. Moreover, data combination techniques, although efficient, are generally not safe and do not make it possible to guarantee an error statistic in the case of malfunctions, which are not caused by failures of the sensors, but by non-robust usage, that is to say outside of safe operating ranges.

In these cases, associating a plurality of redundant inertial units is not sufficient because this concerns a dysfunctional case common to the navigation system built into the vehicle.

Moreover, the geolocation data of navigation units may be used in critical functional chains, regardless for example of whether for the autonomous driving of a vehicle, such as a drone, an aircraft, a train, a motor vehicle, a boat, a submarine, etc., or also for controlling the firing of a cannon or designating targets in a military use case.

In these cases, it is necessary to be able to certify the navigation unit with a sufficient level of criticality with respect to the associated safety risk, and to be able to provide a statistical limit of the geolocation data with a probability of having a navigation error outside of this limit, which is compatible with the safety requirements of the mission.

It is known, in the prior art, and in particular in the field of aeronautics, inertial navigation units using hybridation with radio navigation and ensuring the combination of inertial data with geolocation data coming from GPS, GLONASS, etc., systems.

The error statistics are defined in the document GLOBAL POSITIONING SYSTEM STANDARD POSITIONING SERVICE PERFORMANCE STANDARD [DoD & GPS NavSTAR-2020], with regard to the GPS, for example, and are used to define position error protection radii of the GPS hybrid inertial navigation, even in the case of failure of one or more satellites.

Reference can also be made to the document U.S. Pat. No. 5,760,737 or to the document WO 2012 031940 that describe examples of applications of this hybridation technique with radio navigation.

However, these techniques for calculating position error protection radii are only valid in use cases with a GPS global positioning system and do not cover problems of the type of ground multipath error, deception, or even use cases without GNSS signal (permanent scrambling, etc.).

DISCLOSURE OF THE INVENTION

Therefore, the aim of the invention is to overcome the aforementioned drawbacks and to provide a method and an inertial navigation data calculation unit that are capable of delivering certified geolocation data by providing geolocation data with an accuracy indicator associated with a probability of error.

Another aim of the invention is to use data coming from a non-certified hybrid inertial navigation in a critical inertial navigation functional chain.

Therefore, the object of the invention, according to a first aspect, is a method for calculating inertial navigation data, wherein:
navigation data are acquired; and
hybrid navigation values are calculated based on these navigation data.

According to this method, certified navigation values are calculated, independently of the hybrid navigation values, said certified navigation values being certified with a geolocation error limit.

In one implementation, for the certified navigation values, a first permissible geolocation error limit is calculated corresponding to a geolocation with a predetermined probability of errors.

Thus, the invention makes it possible to calculate, at the same time as a hybrid inertial navigation that is efficient but not certified and without reliable error protection limit, based on the hybridation of inertial data, a simpler and certified inertial navigation, which makes it possible to calculate a reliable protection limit of the hybrid inertial navigation data, without having to certify this hybrid navigation. Protection limit means a geolocation data statistical limit with a probability of having a navigation error outside of this limit.

The hybrid navigation values are certified by calculating a protection limit based on a comparison with a certified and safe inertial navigation, not affected by external sensors or incoherent behavioural mathematical models.

Thus, the hybrid navigation values may be integrated and used in a certified critical functional chain.

In one implementation, for the hybrid navigation values, a second permissible geolocation error limit is calculated based on the first geolocation error limit and on a difference between the hybrid geolocation values and the certified geolocation values.

According to another feature of the method according to the invention, a validity status of the hybrid navigation values is calculated by comparison with respective threshold values.

In one implementation, during the calculation of the certified navigation values, a Kalman filter is used for calculating error covariances based on the navigation data.

For example, the Kalman filter is an invariant Kalman filter.

According to yet another feature of the method according to the invention, a zero velocity update of an inertial navigation stage capable of calculating the certified navigation values is carried out.

It may be envisaged that the hybrid navigation values are calculated based on inertial data from sensors, particularly from three gyroscopes and from three accelerometers, in three spatial directions, and on additional data, particularly movement models.

Another object of the invention is an inertial navigation unit, comprising a navigation data acquisition unit and a first navigation stage capable of calculating hybrid navigation values by combining navigation data.

This unit further includes a second navigation stage capable of calculating certified navigation values independently of the hybrid navigation values, said certified navigation values being certified with a geolocation error limit.

BRIEF DESCRIPTION OF THE DRAWINGS

Other aims, features and advantages of the invention will appear upon reading the following description, given by way of non-limiting example and made with reference to the appended drawings wherein.

DETAILED DISCLOSURE OF AT LEAST ONE EMBODIMENT OF THE INVENTION

Figure 1:
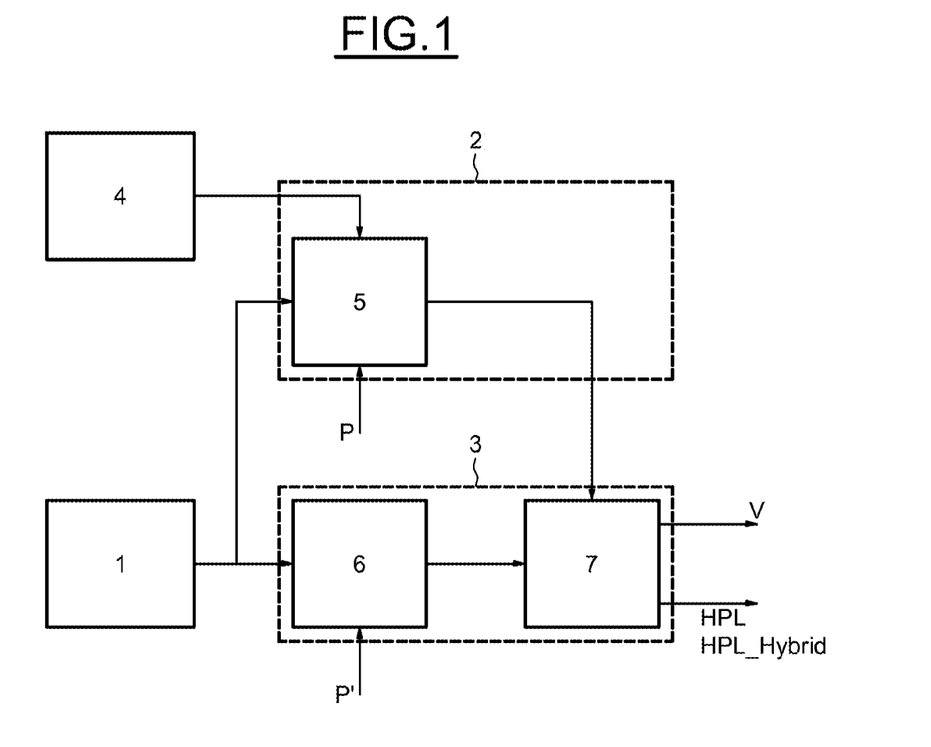
FIG. 1 is a diagram of the hardware architecture of an inertial navigation unit in accordance with the invention.

Reference is made first of all to FIG. 1 that schematically illustrates the architecture of an inertial navigation unit in accordance with the invention.

This unit includes an IMU unit 1 for acquiring inertial navigation data comprising measuring sensors, for example three gyroscopes and three accelerometers delivering inertial data in three spatial directions, a first hybrid navigation stage 2 intended to calculate hybrid inertial navigation values based on inertial navigation data delivered by the acquisition unit 1 and by additional sensors or behaviour models 4 providing additional navigation data, such as GPS geolocation data GPS, data of distances travelled, a movement model of the vehicle, etc., and a second navigation stage 3 providing safe navigation values. The first and second inertial navigation stages are each made up of a calculator duly programmed to implement the functions that will be described hereafter. These calculators may however be formed by calculation partitions of the same calculator.

The first and the second calculation stages accurately ensure the calculation of navigation data values.

The first inertial navigation stage 2 ensures a calculation of the hybrid navigation data, for example the position, the velocity and the altitude, in three dimensions by hybridation, that is to say by combining the data delivered by the inertial data acquisition unit 1 and the external assistance data provided by the sensors or the behaviour models 4.

This first calculation stage includes a calculator 5, which ensures the calculation of these hybrid navigation data. As will be described in detail in the following, it also receives initialisation and position update data P.

The second calculation stage includes a calculator 6, which ensures the calculation of certified navigation data independently of the hybrid navigation data provided by the acquisition unit 1 and an additional calculation module 7 intended to calculate geolocation error protection limits. The calculator 6 receives, as input, position adjustment, zero velocity update and initialisation data P'.

The calculation of the hybrid navigation is a function making it possible firstly to calculate an inertial geolocation solution (3D position, 3D velocity, 3D attitudes) using the combination of measurements from the IMU and external assistance data or behaviour models of the carrier (radio navigation receiver, odometer and vehicle movement model, loch sensor (for a marine carrier), zero velocity update (ZUPT), optical sensor, lidar, etc.) for example using techniques such as the integration of an inertial navigation coupled to a Kalman filter that makes it possible to calculate error covariances based on the features of inertial sensors and assistance sensors or also using other techniques such as particle filtering or neural networks and artificial intelligence.

The calculation of the hybrid navigation is a function secondly making it possible to estimate the 3×3 rotation matrix of the North-East-Down [N] local geographical reference frame at the Body [B] reference frame related to the vehicle:

$$\widehat{C^B_{N\,hybrid}}$$

the notation $\widehat{(\,)}$ designating an estimation of the magnitude $(\,)$, $\widehat{(\,)}$ therefore being marred with errors This also concerns a function making it possible to estimate the velocity components of the vehicle $\widehat{V^N}_{hybrid}$ in the North-East-Down [N] local geographical reference frame, the estimation of the horizontal position coordinates of the vehicle expressed according to the WGS84 ellipsoidal model, for example the estimated longitude $\hat{G}_{hybrid}$ and the estimated latitude $\hat{L}_{hybrid}$, the estimation $\hat{h}_{hybrid}$ of the altitude of the vehicle expressed in relation to the geoid.

The calculation of the hybrid navigation also ensures the calculation of a geolocation error covariance matrix if a Kalman filter is used, based on the geolocation error model. Hybrid navigation geolocation errors are further defined by mathematical modelling.

This concerns, for example angle errors, in 3 dimensions, of the following matrix $\widehat{C^B_{N\,hybrid}}$, projected in the Body [B] reference frame:

$$\underline{\varphi}^B_{hybrid} = \begin{pmatrix} \varphi_{X_{B_{hybrid}}} \\ \varphi_{Y_{B_{hybrid}}} \\ \varphi_{Z_{B_{hybrid}}} \end{pmatrix},$$

defined by the following relations:

$$\underline{\varphi}^B_{hybrid} = \log SO3(C_N^B \cdot (\widehat{C^B_{N\,hybrid}})^T)$$

$$\exp SO3((\underline{\varphi}^B_{hybrid}\times)) = C_N^B \cdot (\widehat{C^B_{N\,hybrid}})^T$$

With $$(\underline{Vect}^B \times) = \begin{pmatrix} 0 & -Vect_{Z_B} & Vect_{Y_B} \\ Vect_{Z_B} & 0 & -Vect_{X_B} \\ -Vect_{Y_B} & Vect_{X_B} & 0 \end{pmatrix}$$

the 3×3 antisymmetric matrix of the vector $\underline{Vect}^B$ expressed in the [B] reference frame;

And where:
"log SO3" is the logarithmic map of the group of SO(3) rotation matrices towards the R3 rotation vectors (R in the meaning of all of the real entries) and
"expSO3" is the exponential map of the R3 rotation vectors of the group of SO(3) rotation matrices, SO(3) being the special orthogonal group of square matrices in 3 dimensions The estimations of the three-dimensional velocity errors, marred with errors, delivered by the first hybrid navigation stage 2, and expressed in the [N] local geographical reference frame by $$\widetilde{V^N}_{hybrid} = \begin{pmatrix} \widetilde{V_{X_N}}_{hybrid} \\ \widetilde{V_{Y_N}}_{hybrid} \\ \widetilde{V_{Z_N}}_{hybrid} \end{pmatrix},$$

are defined by the following relation:

$$\widetilde{V^N}_{hybrid} = \underline{V^N} - \widehat{V^N}_{hybrid}$$

The two-dimensional horizontal position errors expressed in the North-East plane of the [N] local geographical reference frame $\widetilde{r_{X_N}}_{hybrid}$ and $\widetilde{r_{Y_N}}_{hybrid}$, are defined by the following relations:

$$\widetilde{r_{X_N}}_{hybrid} = (L - \hat{L}_{hybrid}) \cdot (R_{X_N}(L) + h)$$

$$\widetilde{r_{Y_N}}_{hybrid} = (G - \hat{G}_{hybrid}) \cdot \cos(L) \cdot (R_{Y_N}(L) + h)$$

It is also possible to define the radial horizontal position error as being the norm of these two components $$\widetilde{r_{horz}}_{hybrid} = \sqrt{(\widetilde{r_{X_N}}_{hybrid})^2 + (\widetilde{r_{Y_N}}_{hybrid})^2}$$

With $R_{X_N}(L)$ the radius of the earth according to the WGS 84 model in the North direction With $R_{Y_N}(L)$ the radius of the earth according to the WGS 84 model in the East direction The altitude errors delivered by the first hybrid inertial navigation stage 2 that correspond to the position error $\hat{h}_{safe}$ safe according to the vertical axis of the [N] local geographical reference frame are defined by $$\tilde{h}_{hybrid} = h - \hat{h}_{hybrid}$$

This combination of data makes it possible to improve the accuracy of the geolocation by reducing the errors presented above, to estimate and compensate inertial sensor errors, to estimate and compensate external assistance errors, and to estimate a statistical performance indicator, for example an error covariance matrix of a Kalman filter.

As regards the second navigation stage 3, the calculation of the certified navigation, called safe, is a function making it possible to calculate an inertial geolocation solution (3D position, 3D velocity, 3D attitudes) using the combination of measurements from the UMI unit 1 and safe external assistance data, for example zero velocity update data upon stopping of the vehicle, or ZUPT update, secured by a stop indicator transmitted to the system presumed to be at the adequate level of operating safety; occasional position update data or any update using a built-in sensor for which it is known how to associated a statistical failure probability and for which it is known how to limit the errors, excluding failure, statistically and independently of the use cases considered.

These calculations for combining data are carried out thanks to the integration of an inertial navigation coupled to a Kalman filter that makes it possible to calculate error covariances based on the features of inertial sensors.

The second navigation calculation stage 3 ensures the calculation of the estimation of the 3×3 rotation matrix of the North-East-Down [N] local geographical reference frame at the Body [B] reference frame related to the vehicle:

$$\widehat{C^B_N}_{safe}$$

The notation $\widehat{()}$ designating an estimation of the magnitude $()$, $\widehat{()}$ therefore being marred with errors It further ensures the estimation of the three-dimensional components of the velocity $\widehat{V^N}_{safe}$ of the vehicle in the North-East-Down [N] local geographical reference frame, as well as the estimation of the horizontal position coordinates of the vehicle expressed according to the WGS84 ellipsoidal model for example the estimated longitude $\hat{G}_{safe}$ and the estimated latitude $\hat{L}_{safe}$ The second navigation calculation stage 3 further calculates the estimation of the altitude of the vehicle $\hat{h}_{safe}$ expressed in relation to the geoid, as well as the calculation of a geolocation error covariance matrix provided by the Kalman filter based on the modelling of geolocation errors.

This "$P_{safe}$" matrix in 9×9 dimensions represents the estimation of the covariances of the 9 geolocation errors selected, namely:

The three-dimensional angle errors of the matrix $\widehat{C^B_N}_{safe}$ projected in the Body [B] reference frame:

$$\underline{\varphi^B}_{safe} = \begin{pmatrix} \alpha_{X_{B_{safe}}} \\ \varphi_{Y_{B_{safe}}} \\ \varphi_{Z_{B_{safe}}} \end{pmatrix},$$

defined by $$\underline{\varphi^B}_{safe} = \log SO3(C_N^B \cdot (\widehat{C^B_N}_{safe})^T)$$

$$\exp SO3((\underline{\varphi^B}_{safe} \times)) = C_N^B \cdot (\widehat{C^B_N}_{safe})^T$$

The three-dimensional velocity errors expressed in the [N] local geographical reference frame:

$$\widetilde{V^N}_{safe} = \begin{pmatrix} \widetilde{V_{X_N}}_{safe} \\ \widetilde{V_{Y_N}}_{safe} \\ \widetilde{V_{Z_N}}_{safe} \end{pmatrix},$$

defined by $$\widetilde{V^N}_{safe} = \underline{V^N} - \widehat{V^N}_{safe}$$

The two-dimensional horizontal position errors expressed in the North-East plane of the [N] local geographical reference frame:

$\tilde{r}_{X_{Nsafe}}$ and $\tilde{r}_{Y_{Nsafe}}$, defined by:

$$\tilde{r}_{X_{Nsafe}} = (L - \hat{L}_{safe}) \cdot (R_{X_N}(L) + h) \text{ and}$$

$$\tilde{r}_{Y_{Nsafe}} = (G - \hat{G}_{safe}) \cdot \cos(L) \cdot (R_{Y_N}(L) + h)$$

The altitude errors that correspond to the position error according to the vertical axis of the [N] local geographical reference:
$\tilde{h}_{safe}$, defined by $$\tilde{h}_{safe} = h - \hat{h}_{safe}$$

It is also possible to define the radial horizontal position error as being the norm of these two components:

$$\tilde{r}_{horz_{safe}} = \sqrt{(\tilde{r}_{X_{Nsafe}})^2 + (\tilde{r}_{Y_{Nsafe}})^2}$$

With:
$R_{X_N}(L)$ the radius of the earth according to the WGS 84 model in the North direction, and
$R_{Y_N}(L)$ the radius of the earth according to the WGS 84 model in the East direction This combination of data makes it possible to improve the accuracy of the geolocation by reducing the errors presented above, to estimate and compensate inertial sensor errors, to estimate a statistical performance indicator, for example an error covariance matrix of a Kalman filter, which is not marred with errors related to bad use cases of external assistance devices since no complex and unsafe external assistance device is used. This indicator is only marred by errors related to a failure of the system but this failure is known and low and corresponds to the undetected probability of failure of the system.

This geolocation is simple, safe but even so efficient, using ZUPT or occasional position updates, in order to make a safe protection radius that can be used during operation possible. These occasional updates make it possible to maintain an acceptable safe geolocation accuracy for the mission.

The second navigation stage 3 moreover ensures the calculation of the protection limit of the geolocation data and validity of the hybrid data. In particular, this calculation makes it possible to define a geolocation data statistical limit with a probability of having a navigation error outside of this limit.

This protection limit, denoted "PL", of the geolocation data errors of the safe navigation is calculated by using the "Psafe" covariance matrix of the geolocation errors of the safe navigation system (covariance matrix provided by the Kalman filter). It contains the variances of the geolocation errors and their mutual correlations.

This covariance matrix is the result of the propagation of the error features of inertial sensors (Gaussian noise statistic, bias errors, sensor scale factor errors, misalignment errors between sensors, etc.) towards the geolocation errors and inclusion of zero velocity (ZUPT) or absolute position updates by the navigation filter The statistical probability of being outside of this protection limit in the absence of failure of one of the inertial sensors, denoted "Proba" is for example:
Proba=1e−5

In the following, protection limit calculation examples will be detailed.

Firstly, the protection limit may be defined by a limit protection circle of the horizontal position error:

$$HPL(Proba) = Q_{inv}(Proba, 2) \cdot \sqrt{VAR_{MAX}}$$

Where
$VAR_{MAX}$ is the maximum specific value of the 2×2 covariance matrix "$P_{safe}([\tilde{r}_{X_{N\text{safe}}}, \tilde{r}_{Y_{N\text{safe}}}], [\tilde{r}_{X_{N\text{safe}}}, \tilde{r}_{Y_{N\text{safe}}}])$," of the North and East horizontal position errors of the Kalman filter of the safe navigation
$Q_{inv}(Proba, N)$ is the inverse of the cumulative distribution function of the standardised Gaussian random variable of dimension N and decorrelated for a probability<Proba For example, for $N = 2$, $Q_{inv}(Proba, 2) = \sqrt{2 \cdot \ln\left(\frac{1}{Proba}\right)}$ ln(x)=natural logarithm evaluated as x
For N=2, Proba=1e−5 et Qinv(1e−5, 2) i.e. approximately 4.7985

In the absence of failure of the navigation unit, this HPL(Proba) limit thus calculated is greater than $\tilde{r}_{horz_{safe}}$ with a probability at least equal to "1−Proba"

In the absence of failure of the navigation unit, this HPL(Proba) limit protection radius thus calculated, centred on the true horizontal position of the vehicle must contain with a probability more or less equal to "1−Proba" the position calculated by the safe navigation.

The protection limit may also be applied to the vertical position error (altitude):

$$ZPL(Proba) = Q_{inv}(Proba, 1) \cdot \sqrt{P_{safe}(\tilde{h}_{safe}, \tilde{h}_{safe})}$$

Where
$P_{safe}(\tilde{h}_{safe}, \tilde{h}_{safe})$ is the variance of the altitude error of the Kalman filter of the safe navigation and
$Q_{inv}(Proba, N)$ is the inverse of the cumulative distribution function of the standardised Gaussian random variable of dimension N and decorrelated for a probability<Proba
For example, for N=1, $Q_{inv}(Proba, 1) = \sqrt{2} \cdot \text{erfcinv}(Proba)$
Where erfcinv is the inverse of the Gauss additional error function
For N=1, Proba=1e−5 and Qinv(1e−5, 1)≈4.4172

In the absence of failure of the navigation unit, this ZPL(Proba) limit thus calculated is greater than $|\tilde{h}_{safe}|$ with a probability at least equal to "1−Proba"

The error protection limit may also be applied to the North, East and vertical velocity components in the local geographical reference frame:

$$VnPL(Proba) = Q_{inv}(Proba, 1) \sqrt{P_{safe}\left(\tilde{V}_{X_{N\text{safe}}}, \tilde{V}_{X_{N\text{safe}}}\right)}$$

Where
$P_{safe}\left(\tilde{V}_{X_{N\text{safe}}}, \tilde{V}_{X_{N\text{safe}}}\right)$ is the variance of the velocity error according to the North axis of the local geographical reference frame of the Kalman filter of the safe navigation and
$Q_{inv}(Proba, N)$ is the inverse of the cumulative distribution function of the standardised Gaussian random variable of dimension N and decorrelated for a probability<Proba In the absence of failure of the navigation unit, this VnPL(Proba) limit thus calculated is greater than $|\widetilde{V_{N_{X_{safe}}}}|$ with a probability at least equal to "1−Proba".

Likewise for respectively the East and vertical velocity errors, this gives:

VePL(Proba)=$Q_{inv}$(Proba,1)·$\sqrt{P_{safe}\left(\widetilde{V_{Y_{N_{safe}}}},\widetilde{V_{Y_{N_{safe}}}}\right)}$ VzPL(Proba)=$Q_{inv}$(Proba,1)·$\sqrt{P_{safe}\left(\widetilde{V_{Z_{N_{safe}}}},\widetilde{V_{Z_{N_{safe}}}}\right)}$ The protection limit of the three-dimensional angle errors projected in the Body [B] reference frame, which is a reference frame of interest for these errors particularly in a case of target designation, of the matrix $\widehat{C^B_{N\,safe}}$, is written:

$$CbxPL(Proba) = Q_{inv}(Proba, 1) \cdot \sqrt{P_{safe}\left(\varphi_{X_{B_{safe}}}, \varphi_{X_{B_{safe}}}\right)}$$

où

$$P_{safe}\left(\varphi_{X_{B_{safe}}}, \varphi_{X_{B_{safe}}}\right)$$

is the variance of the Kalman filter of the safe navigation of the component according to the x-axis of the Body [B] reference frame of the angle errors of the matrix $\widehat{C^B_{N\,safe}}$ and $Q_{inv}$(Proba, N) is the inverse of the cumulative distribution function of the standardised Gaussian random variable of dimension N and decorrelated for a probability<Proba In the absence of failure of the navigation unit, this CbxPL(Proba) limit thus calculated is greater than $$\left|\varphi_{X_{B_{safe}}}\right|$$

with a probability at least equal to "1−Proba"

Likewise, for respectively the angle errors projected in the Body [B] reference frame of the matrix $\widehat{C^B_{N\,safe}}$ according to the axes YB and ZB, this gives:

$$CbyPL(Proba) = Q_{inv}(Proba, 1) \cdot \sqrt{P_{safe}\left(\varphi_{Y_{B_{safe}}}, \varphi_{Y_{B_{safe}}}\right)}$$

$$CbzPL(Proba) = Q_{inv}(Proba, 1) \cdot \sqrt{P_{safe}\left(\varphi_{Z_{B_{safe}}}, \varphi_{Z_{B_{safe}}}\right)}$$

The second certified navigation stage 3 moreover ensures the calculation of a protection limit, denoted "PL_hybrid", of the hybrid navigation geolocation data errors by using the protection limits PL of the safe navigation geolocation data errors associated with the probability "Proba" such as described above, and the difference between the safe navigation and hybrid navigation geolocation data.

Various protection limits, which are based on the calculations of the protection limits defined for the safe geolocation data, may be calculated.

Firstly, it is possible to calculate a limit protection circle of the hybrid position error in the horizontal plane of the local geographical reference frame:

HPL_hybrid(Proba)=HPL(Proba)+ΔPos

Where:

HPL(Proba) is the limit protection circle of the horizontal position errors of the safe navigation presented above, and ΔPos=$\sqrt{(d_{X_N})^2+(d_{X_N})^2}$ is the distance between the two hybrid and safe positions in the horizontal plane of the [N] local geographical reference frame, With $d_{Y_N}=(\hat{L}_{hybrid}-\hat{L}_{safe})\cdot(R_{X_N}(\hat{L}_{safe})+\hat{h}_{safe})$ and $d_{Y_N}=(\hat{G}_{hybrid}-\hat{G}_{safe})\cdot\cos(\hat{L}_{safe})\cdot(R_{Y_N}(\hat{L}_{safe})+\hat{h}_{safe})$ In the absence of failure of the navigation unit, HPL_hybrid(Proba) thus calculated is greater than $\widetilde{r_{horz\,hybrid}}$ with a probability at least equal to "1−Proba"

Indeed, by design (Cauchy Schwartz inequality), $\widetilde{r_{horz\,hybrid}} \le \widetilde{r_{horz\,safe}}+\Delta Pos$ Yet, there is a probability greater than or equal to "1−Proba", by selecting HPL(Proba), that $\widetilde{r_{horz\,safe}} \le$ HPL(Proba).

It is therefore known how to guarantee by selecting HPL_hybrid(Proba) that there is a probability greater than or equal to "1−Proba" that $\widetilde{r_{horz\,hybrid}} \le$ (HPL(Proba)+ΔPos) =HPL_hybrid(Proba)

In the absence of failure of the navigation unit, this HPL_hybrid(Proba) limit protection radius thus calculated, centred on the true horizontal position of the vehicle must contain with a probability more or less equal to "1−Proba" the position calculated by the hybrid navigation.

Secondly, it is possible to calculate a protection limit of the hybrid vertical (altitude) position error:

ZPL_hybrid(Proba)=ZPL(Proba)+Δh

Where

HPL(Proba) is the limit protection circle of the horizontal position errors of the safe navigation presented above $\Delta h=|\hat{h}_{hybrid}-\hat{h}_{safe}|$ is the distance between the two hybrid and safe altitudes.

In the absence of failure of the navigation unit, ZPL_hybrid(Proba) thus calculated is greater than $|\hat{h}_{hybrid}|$ with a probability at least equal to "1−Proba"

Indeed, by design (Cauchy Schwartz inequality), $|\hat{h}_{hybrid}| \le |\hat{h}_{safe}|+\Delta h$ Yet, there is a probability greater than or equal to "1−Proba", by selecting ZPL(Proba), that $|\hat{h}_{safe}| \le$ ZPL(Proba).

It is therefore known how to guarantee by selecting ZPL_hybrid(Proba) that there is a probability greater than or equal to "1−Proba" that $|\hat{h}_{hybrid}| \le$ (ZPL(Proba)+Δh) =ZPL_hybrid(Proba)

It is also possible to calculate a protection limit of the North, East and Vertical hybrid velocity errors in the local geographical reference frame.

For example, using the same principle as described above, it is possible to define, for the protection limit of the North hybrid velocity errors a protection limit of the error $\widetilde{V_{X_{N\,hybrid}}}$, based on the relation:

VnPL_hybrid(Proba)=VnPL(Proba)+ΔVn

Where:
VnHPL(Proba) is the protection limit of the velocity error according to the North axis of the [N] local geographical reference frame, and $\Delta Vn = \left| \widetilde{V_{X_{N}}}_{hybrid} - \widetilde{V_{X_{N}}}_{safe} \right|$ is the difference between the two hybrid and safe North velocities In the absence of failure of the navigation unit, Vn_hybrid (Proba) thus calculated is greater than $\left| \widetilde{V_{X_{N}}}_{hybrid} \right|$ with a probability at least equal to "1−Proba"

It is also possible to define a protection limit of the error $\widetilde{V_{Y_{N}}}_{hybrid}$:

$$VePL\_hybrid(Proba) = VePL(Proba) + \Delta Ve$$

Where:
VeHPL(Proba) is the protection limit of the velocity error according to the East axis of the [N] local geographical reference frame, and $\Delta Ve = \left| \widetilde{V_{Y_{N}}}_{hybrid} - \widetilde{V_{Y_{N}}}_{safe} \right| =$ between the two hybrid and safe East velocities In the absence of failure of the navigation unit, Ve_hybrid (Proba) thus calculated is greater than $\left| \widetilde{V_{Y_{N}}}_{hybrid} \right|$ with a probability at least equal to "1−Proba"

It is also possible to define a protection limit of the error $\widetilde{V_{Z_{N}}}_{hybrid}$:

$$VzPL\_hybrid(Proba) = VzPL(Proba) + \Delta Vz$$

Where:
VzHPL(Proba) is the protection limit of the velocity error according to the vertical axis of the [N] local geographical reference frame, and $\Delta Vz = \left| \widetilde{V_{Z_{N}}}_{hybrid} - \widetilde{V_{Z_{N}}}_{safe} \right|$ is the difference between the two hybrid and safe vertical velocities In the absence of failure of the navigation unit, Vz_hybrid (Proba) thus calculated is greater than $\left| \widetilde{V_{Z_{N}}}_{hybrid} \right|$ with a probability at least equal to "1−Proba"

It is also possible to calculate a protection limit of the three-dimensional angle errors of the matrix $\widehat{C^{B}_{N}}_{hybrid}$ projected in the Body [B] reference frame.

By way of example, the protection limit of the error $$\varphi_{X_{B_{hybrid}}}$$

is:

$$CbxPL\_hybrid(Proba) = CbxPL(Proba) + |\Delta \varphi_{X_B}|$$

Where:
CbxPL_hybrid(Proba) is the protection limit of the component according to XB of the angle errors of the matrix $\widehat{C^B_N}_{safe}$ and $$\underline{\Delta \varphi^B} = \begin{pmatrix} \Delta \varphi_{X_B} \\ \Delta \varphi_{Y_B} \\ \Delta \varphi_{Z_B} \end{pmatrix} = \log SO3\left( \widehat{C^B_{N\,hybrid}} \cdot (\widehat{C^B_{N\,safe}})^T \right)$$

In the absence of failure of the navigation unit, CbxPL_hybrid(Proba) thus calculated is greater than $$\left| \varphi_{X_{B_{hybrid}}} \right|$$

with a probability at least equal to "1−Proba"
Indeed, this gives:

$$C^B_N \cdot (\widehat{C^B_{N\,hybrid}})^T = C^B_N \cdot \underbrace{((\widehat{C^B_{N\,safe}})^T \cdot \widehat{C^B_{N\,safe}})}_{identité\ I_3} \cdot (\widehat{C^B_{N\,hybrid}})^T$$
$$= \left( C^B_N \cdot (\widehat{C^B_{N\,safe}})^T \right) \cdot \left( \widehat{C^B_{N\,safe}} \cdot (\widehat{C^B_{N\,hybrid}})^T \right)$$

That is to say also $$C_N^B \cdot (\widehat{C^B_N}_{hybrid})^T = (C_N^B \cdot (\widehat{C^B_N}_{safe})^T) \cdot (\widehat{C^B_N}_{hybrid} \cdot (\widehat{C^B_N}_{safe})^T)^T$$

And therefore $$\exp SO3((\underline{\varphi^B}_{hybrid} \times)) = \exp SO3((\underline{\varphi^B}_{safe} \times)) \cdot \exp SO3((\underline{\Delta \varphi^B} \times))^T$$

$$\exp SO3((\underline{\varphi^B}_{hybrid} \times)) = \exp SO3((\underline{\varphi^B}_{safe} \times)) \cdot \exp SO3(-(\underline{\Delta \varphi^B} \times))$$

Yet for low amplitude angles, for example of norm less than 10e−3 radian, this gives, with the first order:

$$\exp SO3((\underline{\varphi^B}_{hybrid} \times)) \approx I_3 + (\underline{\varphi^B}_{hybrid} \times)$$

$$\exp SO3(-(\underline{\Delta^B} \times)) \approx I_3 - (\underline{\Delta \varphi^B} \times)$$

It can be deduced therefrom for low amplitude angles, for example of norm less than 10e−3 radian, with the first order:

$$I_3 + (\underline{\varphi^B}_{hybrid} \times) = I_3 + (\underline{\varphi^B}_{safe} \times) - (\underline{\Delta \varphi^B} \times)$$

And therefore $$(\underline{\varphi^B}_{hybrid} \times) = (\underline{\varphi^B}_{safe} \times) - (\underline{\Delta \varphi^B} \times) = ((\underline{\varphi^B}_{safe} - \underline{\Delta \varphi^B}) \times)$$

By uniqueness between antisymmetric matrix of a vector and this same vector, it can be deduced:

$$\underline{\varphi^B}_{hybrid} = \underline{\varphi^B}_{safe} - \underline{\Delta \varphi^B}$$

This then gives the following inequality for the component according to XB:

$$\left| \varphi_{X_{B_{hybrid}}} \right| \leq \left| \varphi_{X_{B_{safe}}} \right| + \left| \Delta \varphi_{X_B} \right|$$

Yet, there is a probability greater than or equal to "1−Proba", by selecting CbxPL(Proba), that $$\left| \varphi_{X_{B_{safe}}} \right| \leq CbxPL(Proba)$$

It is therefore known how to guarantee by selecting CbxPL_hybrid(Proba) that there is a probability greater than or equal to "1−Proba" that $$\left| \varphi_{X_{B_{hybrid}}} \right| \leq \left( CbxPL(Proba) - \left| \varphi_{X_B} \right| \right) = CbxPL\_hybrid(Proba)$$

Likewise, the protection limits of the errors $\varphi_{X_{B_{hybrid}}}$ and $\varphi_{Z_{B_{hybrid}}}$ are calculated. For example, as regards $\varphi_{Y_{B_{hybrid}}}$, this limit is calculate based on the following relation:

$$CbyPL\_hybrid(Proba) = CbyL(Proba) + |\Delta\varphi_{Y_B}|$$

Where:
CbyPL_hybrid(Proba) is the protection limit of the component according to YB of the angle errors of the matrix $\widehat{C_N^B}_{safe}$ and $$\underline{\Delta\varphi^B} = \begin{pmatrix} \Delta\varphi_{X_B} \\ \Delta\varphi_{Y_B} \\ \Delta\varphi_{Z_B} \end{pmatrix} = \log SO3\left(\widehat{C_N^B}_{hybrid} \cdot \left(\widehat{C_N^B}_{safe}\right)^T\right)$$

In the absence of failure of the navigation unit, CbyPL_hybrid(Proba) thus calculated is greater than $$\left|\varphi_{X_{B_{hybrid}}}\right|$$

with a probability at least equal to "1−Proba".

The CbzPL_hybrid(Proba) limit is calculated in a similar way.

Figure 2:
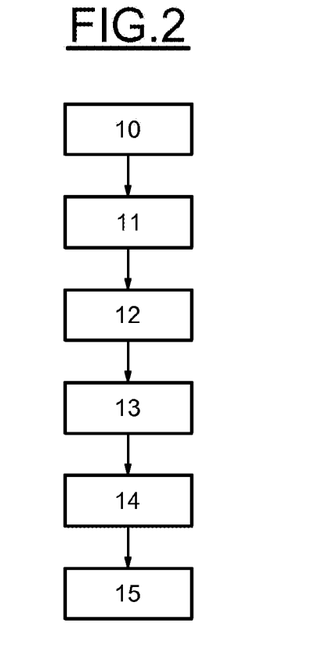
FIG. 2 illustrates the main steps of a method for calculating inertial navigation data in accordance with the invention

With reference to FIG. 2, which illustrates the main phases of a method for calculating inertial navigation data in accordance with the invention, according to a first step 10, the inertial data acquisition unit 1 acquires data coming from at least three gyroscopes and from at least three inertial accelerometers that measure the inertial rotations and the inertial specific forces in the three spatial directions.

Likewise, during this step 10, the data coming from other sensors 4 are also acquired.

It will be noted that the sensors of the inertial data acquisition unit 1 are developed and certified according to the required safety constraints, according to the criticality of feared events.

During the next step 11, the first navigation stage 2 delivers the first navigation data by combining initial data from the inertial data acquisition unit 4 and from any other additional navigation data coming from additional sensors 4.

It will be noted that after this calculation step 11, the navigation data provided at the end of this first calculation step are relatively accurate but are difficult to certify.

During the next step 12, the second navigation stage 3 ensures the calculation of safe navigation data based, particularly, on error covariances and based on the features of inertial sensors, as described above.

It will be noted that these acquisition and calculation steps are carried out continuously.

However, position update phases are carried out, for example, during the passage to known locations. Zero velocity update phases are also implemented in order in particular to update the velocity data.

During the next step 13, a calculation of the protection limits is carried out that corresponds to a protection error level, for the first and second inertial navigation stages.

Figure 3:
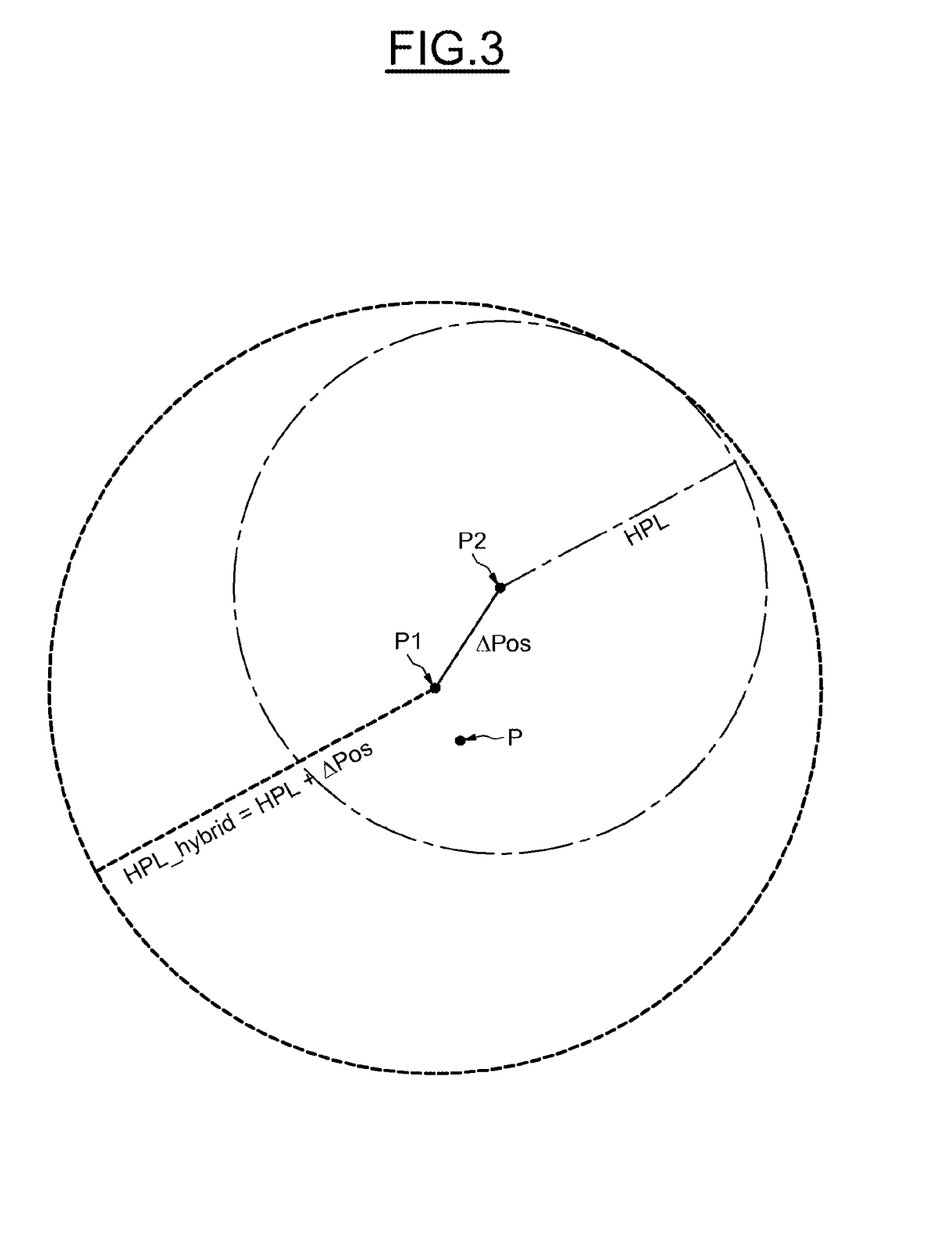
FIG. 3 shows a diagram illustrating the first and second navigation data with their permissible geolocation error limit in the form of limit protection circles of the position error.

By referring also to FIG. 3, wherein P designates a real position, and P1 and P2 designate the position calculated by the first and the second navigation stage 2 and 3, respectively, during this step, as previously indicated, the protection limit of the geolocation data errors of the safe navigation is calculated from the second inertial navigation stage.

This protection limit, denoted HPL, here constitutes a limit protection circle of the geolocation error centred on the position P2 calculated by the second navigation stage 3.

During the next step 14, the protection limit of the geolocation data errors calculated by the first navigation stage 2 is calculated, as disclosed above.

This HPL_hybrid protection limit forms a limit protection circle of the position error provided by the first navigation stage 2, centred on the position P1 geolocated by this first navigation stage and the radius of which is formed by the sum of the difference between the geolocation data provided by the first and second navigation stages and the HPL protection limit calculated during the preceding step 13.

During the next step 15, a validity status V of the first hybrid navigation data is calculated by comparison with respective threshold values.

First of all, a coherence test of the hybrid geolocation data is performed beforehand in order to check the coherence of the data, such as the stated validity of the data, the format of the data, the interval of the data, etc. In the opposite case, an invalidity status of the data is issued.

Moreover, the differences measured between the hybrid navigation and the optimal navigation calculated beforehand are also compared with thresholds in order to raise the anomaly statuses with the user and inform them to no longer consider the hybrid navigation data.

For example, it is possible to use a fraction of the protection limits "PL" of the safe navigation errors as anomaly raising threshold.

The validity calculation may be of the type:
If the coherence test of the hybrid geolocation data is invalid
Or if ΔPos>Threshold_pos
Or if Δh>Threshold_Z
Or if ΔVn>Threshold_Vn
Etc.
Then the hybrid navigation data are invalid
Otherwise the hybrid navigation data are valid
End If It will be noted that the calculations implemented within the navigation units are carried out within two separate calculators, or partitions of a calculator, respectively ensuring the calculation of the hybrid navigation data and the calculation of the safe navigation data, which makes it possible to avoid constraining the low software and hardware layers of the calculation member of the hybrid navigation which is not in the critical functional chain of the invention.

The proposed solution makes it possible to use the data from any non-certified hybrid navigation in a critical functional chain thanks to securing these data through a certified software or hardware partition that calculates for these non-certified navigation data a protection limit based on the comparison with a safe navigation, not impacted by external sensors or certified and incoherent behavioural mathematical models.

Thus, any navigation hybridation technique (complex Kalman filter, particle filter, neural network, artificial intelligence, etc.) may be used without having to certify these processes, while guaranteeing a level of integrity of the data thanks to the calculation of certified and reliable protection limits.

The safe navigation data as well as their protection limits are also available as backup solutions, used for example when the difference between the safe and hybrid navigation geolocation data is greater than a threshold for example.

The invention claimed is:

1. A method for calculating inertial navigation data, wherein:
   navigation data are acquired; and
   hybrid navigation values are calculated based on these navigation data; and
   certified navigation values are calculated, independently of the hybrid navigation values, said certified navigation values being certified with a geolocation error limit,
   wherein, for the certified navigation values, a first permissible geolocation error limit is calculated corresponding to a geolocation with a predetermined probability of error, and
   wherein, for the hybrid navigation values, a second permissible geolocation error limit is calculated based on the first geolocation error limit and on a difference between the hybrid navigation values and the certified navigation values.

2. The method according to claim 1, wherein a validity status (V) of the hybrid navigation values is calculated by comparison with respective threshold values.

3. The method according to claim 1, wherein, during the calculation of the certified navigation values, a Kalman filter is used for calculating error covariances based on the navigation data.

4. The method according to claim 3, wherein the Kalman filter is an invariant Kalman filter.

5. The method according to claim 1, wherein a zero velocity updating is performed on an inertial navigation stage capable of calculating the certified navigation values.

6. The method according to claim 1, wherein the hybrid navigation values are calculated based on inertial data from measuring sensors in three spatial directions, and on additional data, particularly from movement models.

7. An inertial navigation unit, comprising:
   a navigation data acquisition unit;
   a first navigation stage capable of calculating hybrid navigation values by combining navigation data; and
   a second navigation stage capable of calculating certified navigation values, independently of the hybrid navigation values, said certified navigation values being certified with a geolocation error limit,
   wherein, for the certified navigation values, a first permissible geolocation error limit is calculated corresponding to a geolocation with a predetermined probability of error, and
   wherein, for the hybrid navigation values, a second permissible geolocation error limit is calculated based on the first geolocation error limit and on a difference between the hybrid navigation values and the certified navigation values.

\* \* \* \* \*